United States Patent [19]
Baldwin et al.

[11] Patent Number: 6,008,814
[45] Date of Patent: Dec. 28, 1999

[54] METHOD AND SYSTEM FOR PROVIDING NETWORK NAVIGATION AIDS

[75] Inventors: Wayne Ross Baldwin, Cedar Park; Athanasios George Gaitatzes, Austin, both of Tex.

[73] Assignee: International Business Machines Corporation, Armonk, N.Y.

[21] Appl. No.: 08/862,690

[22] Filed: May 23, 1997

[51] Int. Cl.$^6$ .................................................. G06F 15/00
[52] U.S. Cl. ........................... 345/427; 345/419; 345/423
[58] Field of Search ..................................... 345/427, 419, 345/423

[56] References Cited

U.S. PATENT DOCUMENTS

| | | | |
|---|---|---|---|
| 5,276,789 | 1/1994 | Besaw et al. ............................ | 395/140 |
| 5,371,744 | 12/1994 | Campbell et al. ....................... | 371/8.2 |
| 5,500,929 | 3/1996 | Dickinson ............................... | 395/160 |
| 5,543,789 | 8/1996 | Behr et al. .............................. | 340/995 |
| 5,544,051 | 8/1996 | Senn et al. .............................. | 364/419 |
| 5,572,643 | 11/1996 | Judson .................................... | 395/793 |
| 5,592,599 | 1/1997 | Lindholm ............................... | 395/127 |
| 5,704,024 | 12/1997 | Voorhies et al. ....................... | 395/126 |

*Primary Examiner*—Mark K. Zimmerman
*Assistant Examiner*—Chanté Harrison
*Attorney, Agent, or Firm*—Volel Emile; Andrew J. Dillon

[57] ABSTRACT

A method and system are displayed in a computer network for providing a two-dimensional representation of a three-dimensional graphic representation to be displayed in association with the three-dimensional graphic representation. The computer network includes a client connectable to a server. Initially, a remote application is transferred from the server to a client. Next, the remote application is displayed within a graphic interface of the client system. Thereafter, the remote application is automatically searched for three-dimensional data representative of a three-dimensional graphic representation. If the remote application includes three-dimensional data, then the three-dimensional data is automatically converted to a two-dimensional representation. Thereafter, the two-dimensional representation is displayed within the graphic interface of the client system in association with the remote application.

15 Claims, 9 Drawing Sheets

METHOD AND SYSTEM FOR PROVIDING NETWORK NAVIGATION AIDS

BACKGROUND OF THE INVENTION

1. Technical Field

The present invention relates to improved information-retrieval methods and systems. In particular, the present invention relates to graphical network navigation aids.

2. Description of the Related Art

The development of computerized information resources, such as remote networks, allow users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

One type of remote network commonly utilized in recent years is the Internet. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allows users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-linked information is contained within hypermedia and hypertext documents, allowing a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "Web pages" constructed from a Hypertext Markup Language (HTML), or other server-generated data. Each Web page also can be referred to simply as a "page."

The client and server typically display browsers and other remote network data for a user via a graphical user interface.

A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

The evolution of personal computers over the last decade has accelerated the Web and Internet toward useful everyday applications. Nearly every computer sold over the last several years has or will, at some point, become "on-line" to an Internet service provider. Somewhere between 20 and 30 million people around the globe use some form of Internet service on a regular basis. The graphical portion of the World Wide Web itself is usually stocked with more than twenty-two million "pages" of content, with over one million new pages added every month.

Free or relatively inexpensive computer software applications such as Internet "search engines" make it simple to track down sites where an individual can obtain information on a topic of interest. A person may type in a subject or key word and generate a list of network sites (i.e., Web sites). Thus, with "home pages" published by thousands of companies, universities, government agencies, museums, and municipalities, the Internet can be an invaluable resource. With a little practice, even new users can skim millions of Web pages or thousands of newsgroups, not only for topics of general interest, but also to access precise bits of data. The market for Internet access and related applications is explosive and is growing faster than expected, doubling in size approximately every three months.

The explosive growth of the Internet has included an ever increasing number of Web sites that present information to users in a three-dimensional graphical environment. As computer processor speeds also increase, the display of three-dimensional graphical "worlds" or environments via Web pages, is becoming readily available to users via the Internet. As a result, the information presented on Web pages are becoming graphically three-dimensional in nature. However, such graphical three-dimensional Web sites are complex in nature, and first-time and even experienced users can have trouble navigating through such Web sites. For example, a typical three-dimensional Web site might include a series of graphical representations of hallways, buildings, and windows. Utilizing a pointing device such as a mouse allows a user to access information via such hallways, buildings, and windows. A user might, for example, "click" a graphical representation of a doorway and trigger loading of a graphical representation of another hallway through which additional information can be obtained, but only by navigating through a newly presented series of hallways or paths. In addition, a user might be forced to interact with other users in order to access specific types of information.

It can be appreciated from the foregoing that a need exists to provide users with some sort of graphical three-dimensional navigation aid. The solution lies in the creation of two-dimensional maps that can be displayed along with each encountered graphical three-dimensional Web site. Such maps would allow users the ability to have a better view of the graphical three-dimensional environment and make better choices in navigating through such graphical three-dimensional environments in order to find desired information.

SUMMARY OF THE INVENTION

It is therefore an object of the invention to provide an improved information-retrieval method and system.

It is another object of the invention to provide an improved graphical network navigation aid.

The above and other objects are achieved as is now described. Disclosed are a method and system in a computer network for providing a two-dimensional representation of a three-dimensional graphic representation to be displayed in association with the three-dimensional graphic representation. The computer network includes a client connectable to a server. Initially, a remote application is transferred from the server to a client. Next, the remote application is displayed within a graphic interface of the client system. Thereafter, the remote application is automatically searched for three-dimensional data representative of a three-dimensional graphic representation. If the remote application includes three-dimensional data, then the three-dimensional data is automatically converted to a two-dimensional representation. Thereafter, the two-dimensional representation is displayed within the graphic interface of the client system in association with the remote application.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
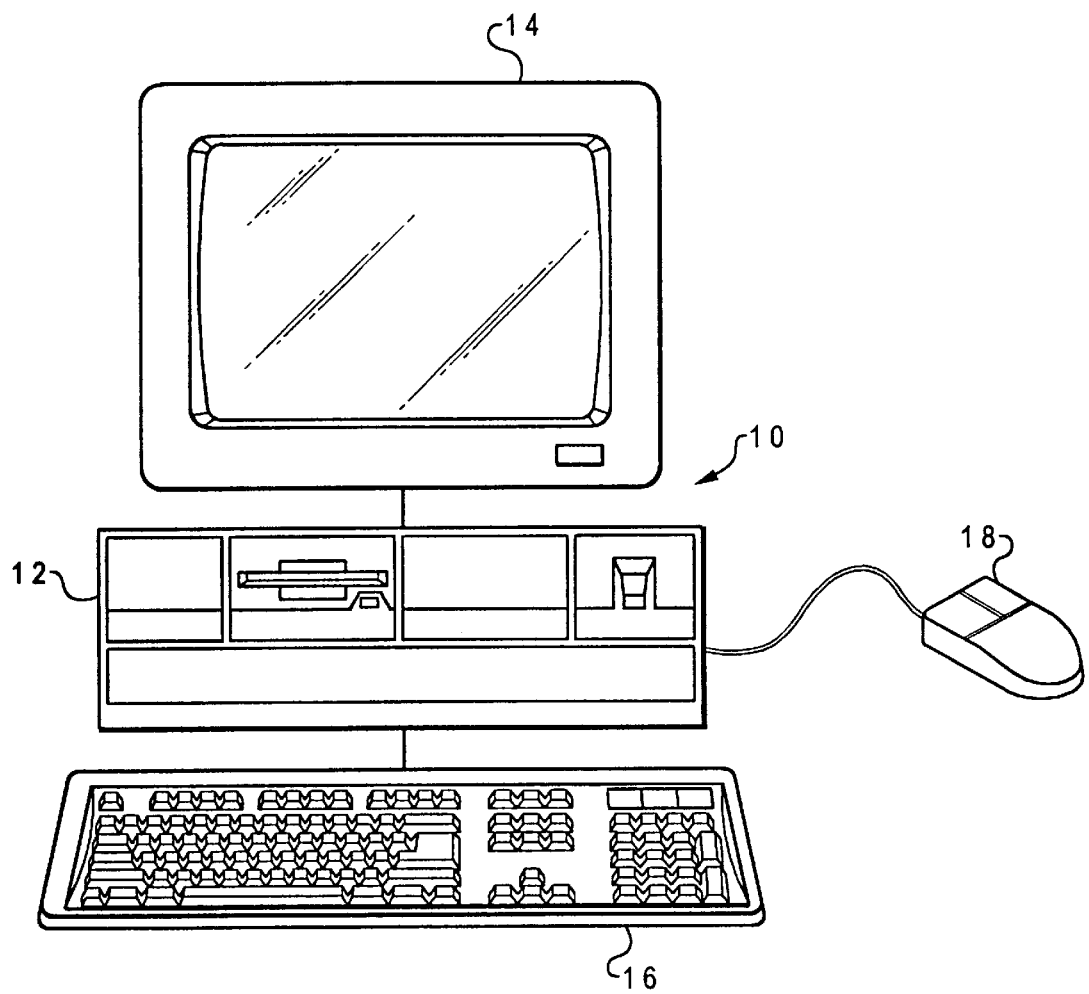
FIG. 1 is a pictorial representation of a data-processing system which can be utilized to implement the method and system of the present invention.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer, such as the IBM RISC/6000 computer, a product of International Business Machines Corporation "RISC SYSTEM/6000" is a trademark of International Business Machines Corporation, and also can be referred to as the "RS/6000."

Figure 2:
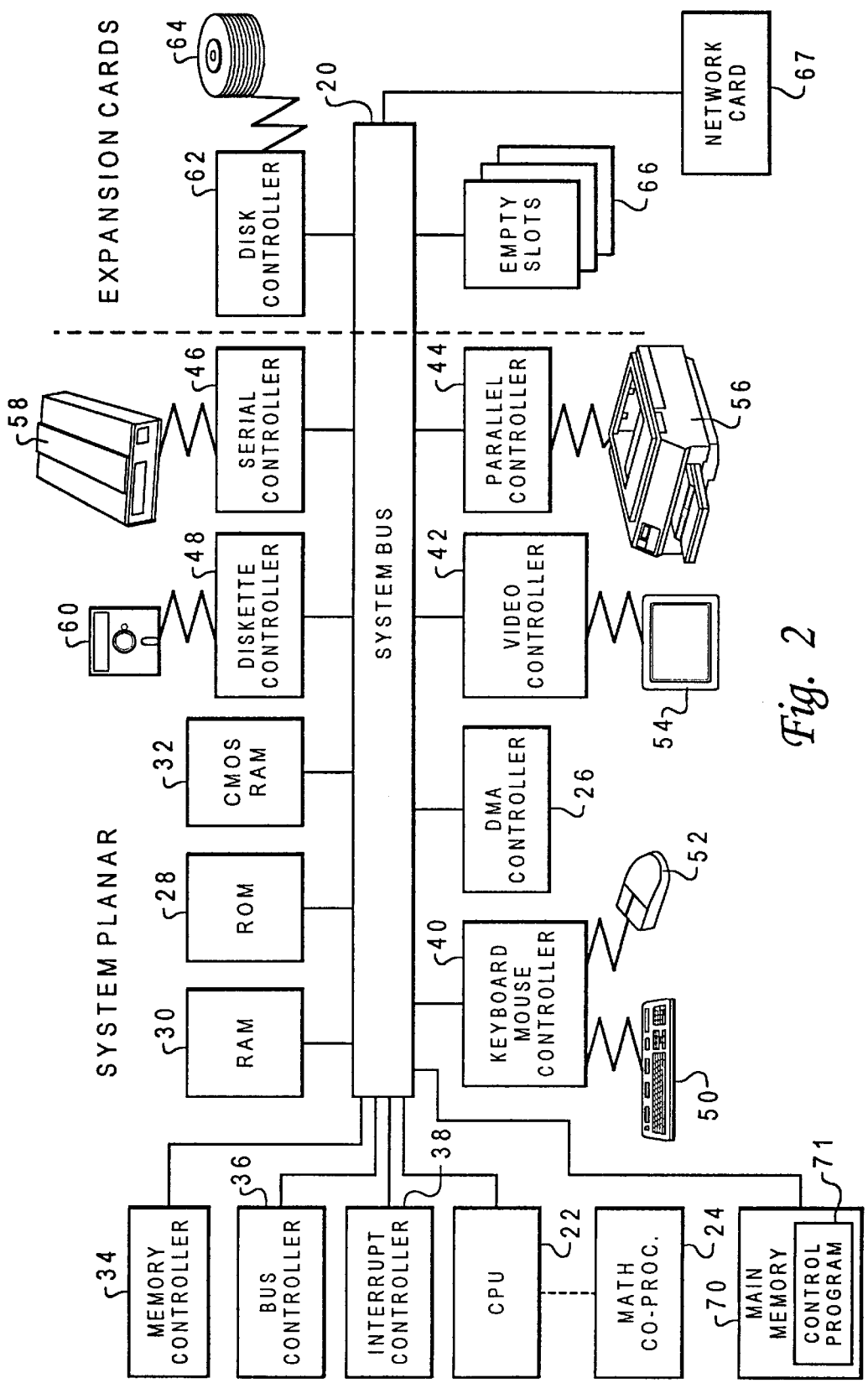
FIG. 2 depicts a block diagram illustrative of selected components in a personal computer system which can be utilized to implement the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20, and includes a control program 71. Control program 71 resides within main memory 70 and contains instructions that when executed on CPU 22 carry out the operations depicted in the logic flowchart of FIG. 7 described herein. The computer program product also can be referred to as a program product. Control program 71 can support a number of Internet-access tools including, for example, an HTTP-compliant Web "browser." Known browser software applications include: Netscape Navigatore® ("Netscapel"), Mosaic, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Illinois. The present invention is designed to operate with any of these known or developing Web browsers, in order to provide network navigation aids for Web pages displayed with three-dimensional graphics.

Control program 71 also can support other remote network services, such as the file-transfer protocol (FTP) service, which facilitates the transfer and sharing of files across remote networks such as the Internet. Control program 71 can further support remote network services, such as remote terminal access (Telnet), which allows users to log onto computers coupled to the network. In addition, control program 71 additionally can support services, such as simple mail-transfer protocol (SMTP) or e-mail, and networknews-transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture or to groups of computers and associated devices which are connected by communications facilities. Those skilled in the art will appreciate that the hardware depicted in FIG. 2 may vary for specific applications. For example, other peripheral devices, such as: optical-disk media, audio adapters, or chipprogramming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
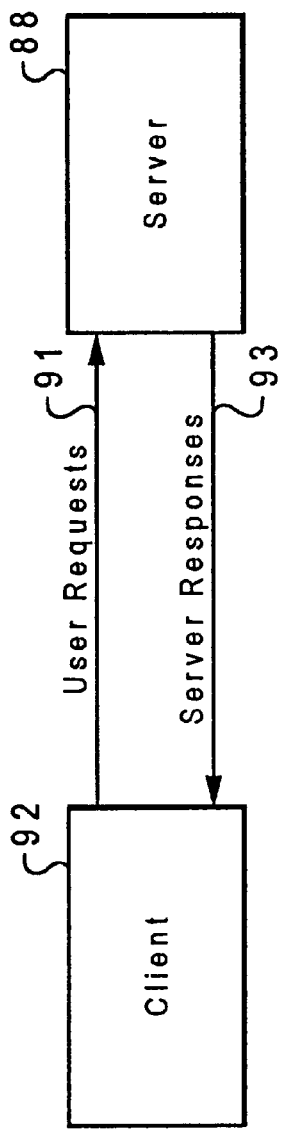
FIG. 3 illustrates a block diagram illustrative of a client/server architecture which can be utilized to implement the method and system of the present invention.
Figure 4:
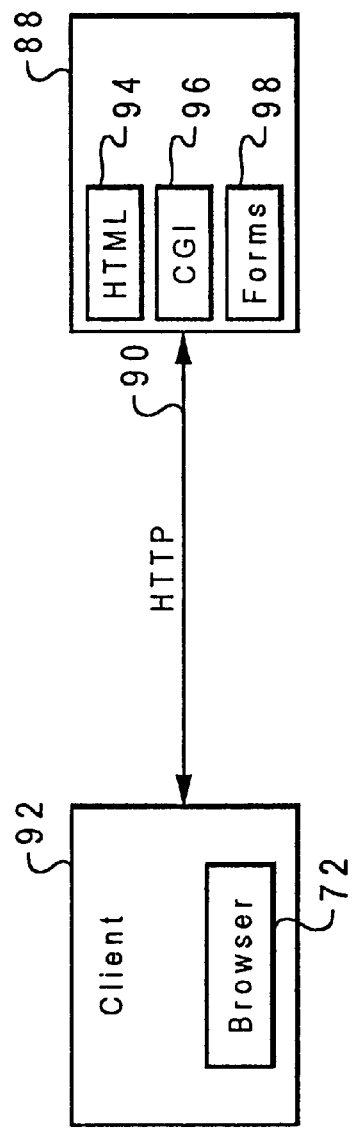
FIG. 4 depicts a detailed block diagram illustrative of a client/server architecture which can be utilized to implement the method and system of the present invention.
Figure 5:
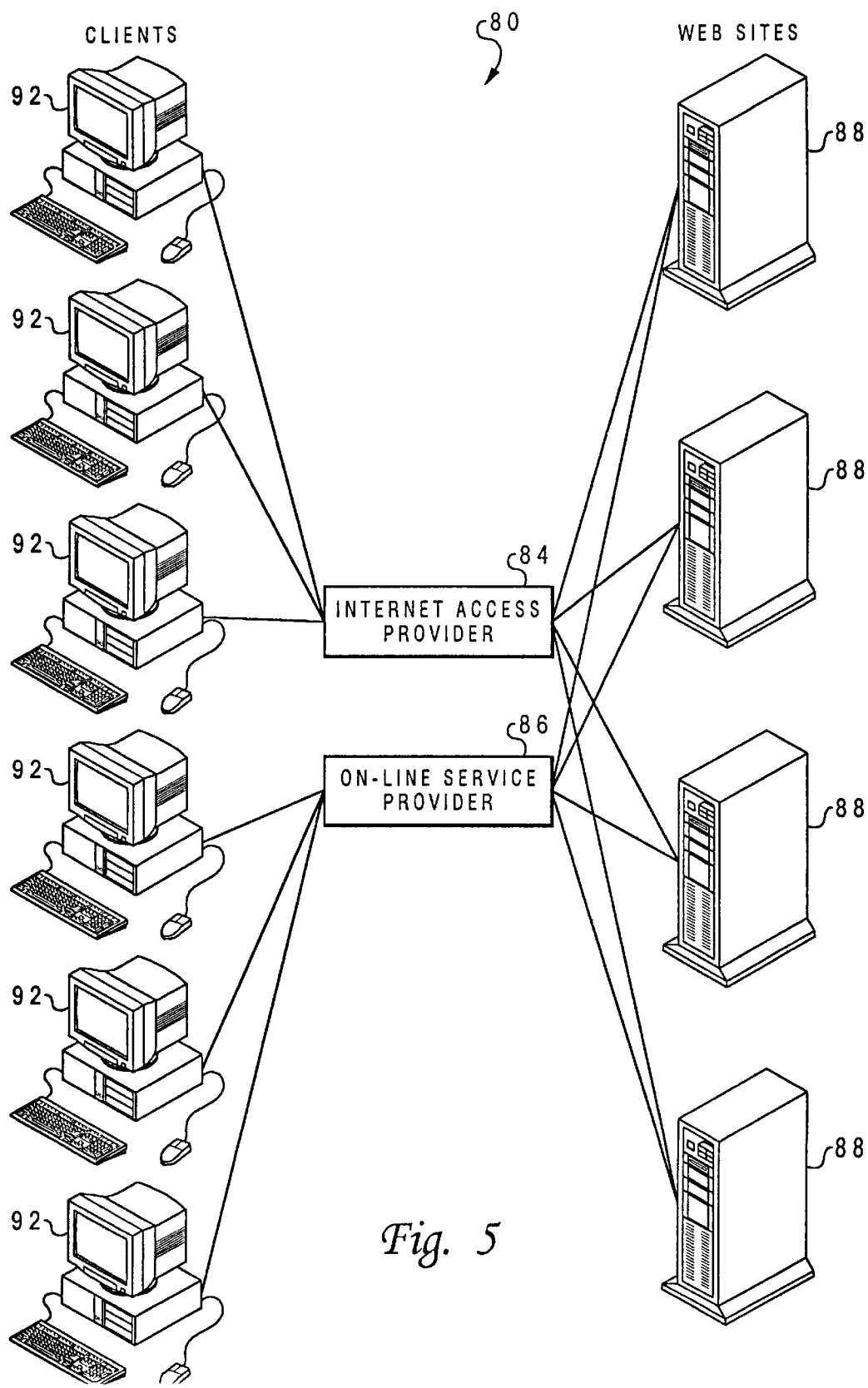
FIG. 5 is a diagram illustrative of a computer network which can be implemented in accordance with the method and system of the present invention.

In FIG. 3, FIG. 4, and FIG. 5, like parts are indicated by like numbers. FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "Web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Illinois, can be utilized with a preferred embodiment of the present invention. Other browsers, such as Netscape™, Netcruiser, or the Lynx-brand browsers or others which are available and provide the functionality specified under HTTP can be utilized with the present invention.

Server 88 executes the corresponding server software which presents information to the client in the form of HTTP responses 90. The HTTP responses 90 correspond with Web "pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion. Common Gateway Interlace (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user, via a client application program, to specify terms in which the server causes an application program to function (e.g., terms or keywords contained in the types of stories/articles which are of interest to the user).

FIG. 5 is a diagram illustrative of a computer network 80 which can be implemented in accordance with the method and system of the present invention. Computer network 80 is representative of a remote network, specifically the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a browser, a known software tool utilized to access servers 88 via the access providers 84. Each server 88 operates a Web site which supports files in the form of documents and pages. A network path to servers 88 is identified by a Universal Resource Locator having a known syntax for defining a network collection.

Figure 6:
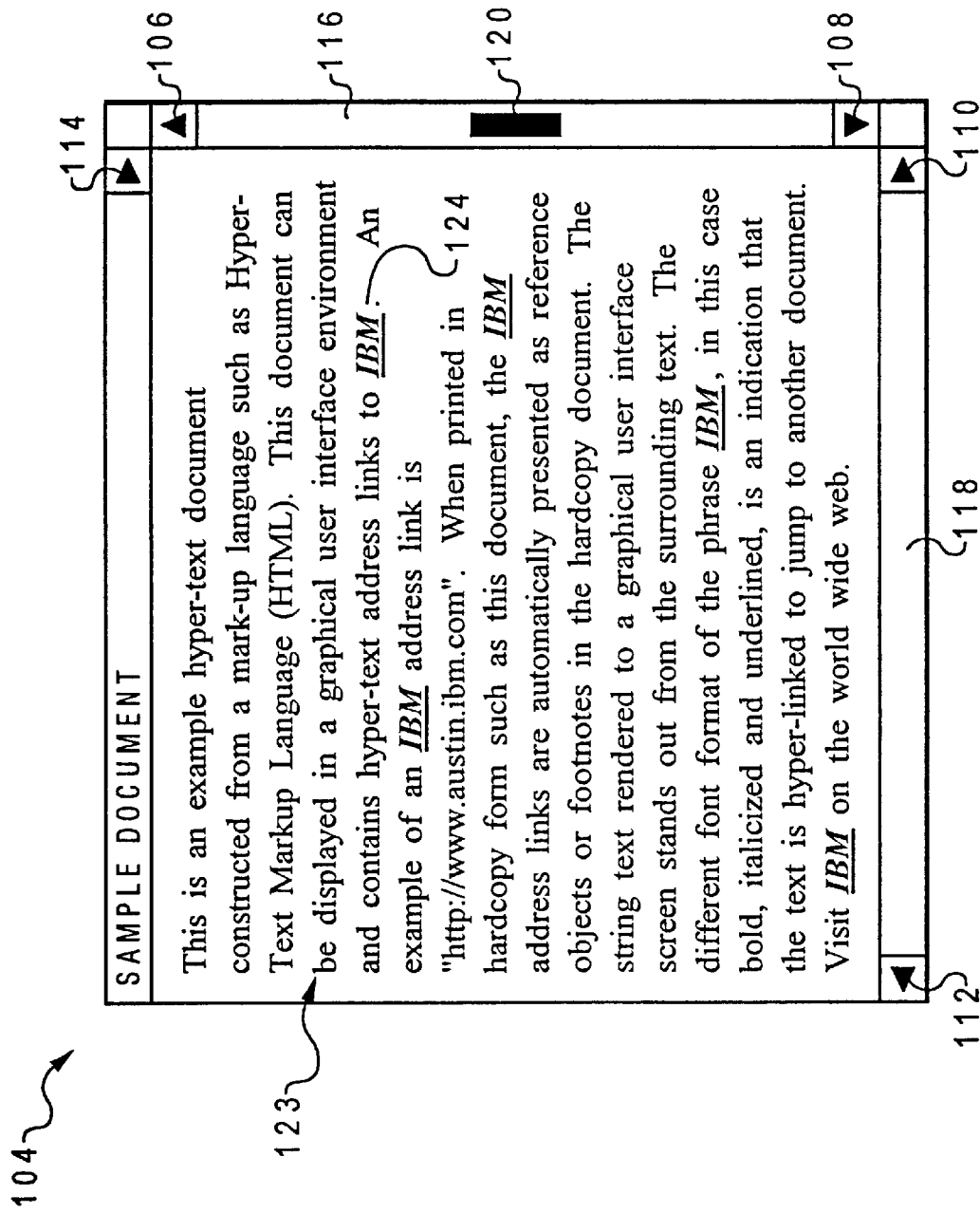
FIG. 6 illustrates a hypertext document contained within a graphical user interface window which can be utilized to implement the method and system of the present invention.

FIG. 6 illustrates an example hypertext document 123 contained within a graphical user interface window 104 which can be utilized in accordance with the method and system of the present invention. Window 104 displays a portion of a hypertext document 123 constructed from a mark-up language, such as Hypertext Mark-up Language (HTML). The size and position of elevator 120 within scroll bar 116 corresponds to the size and position of the current viewable page in relation to hypertext document 123. Hypertext document 123 can be accessed from a data-processing system contained within a remote network, such as the Internet.

In the example of FIG. 6, in view of the fact that hypertext document 123 includes too many pages to view simultaneously, the user can position a mouse cursor over up-arrow section 106 or arrow section 108 of scroll bar 116 and click a pointing device (e.g., a mouse) to scroll hypertext document 123 upward or downward, as appropriate. A vertical scroll bar 118 includes arrow sections 112 and arrow sections 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user "clicks" on string text 124 with a mouse or other pointing device, the graphical user interface shifts the presently viewed hypertext document 123 to another hyper-linked document.

Figure 7:
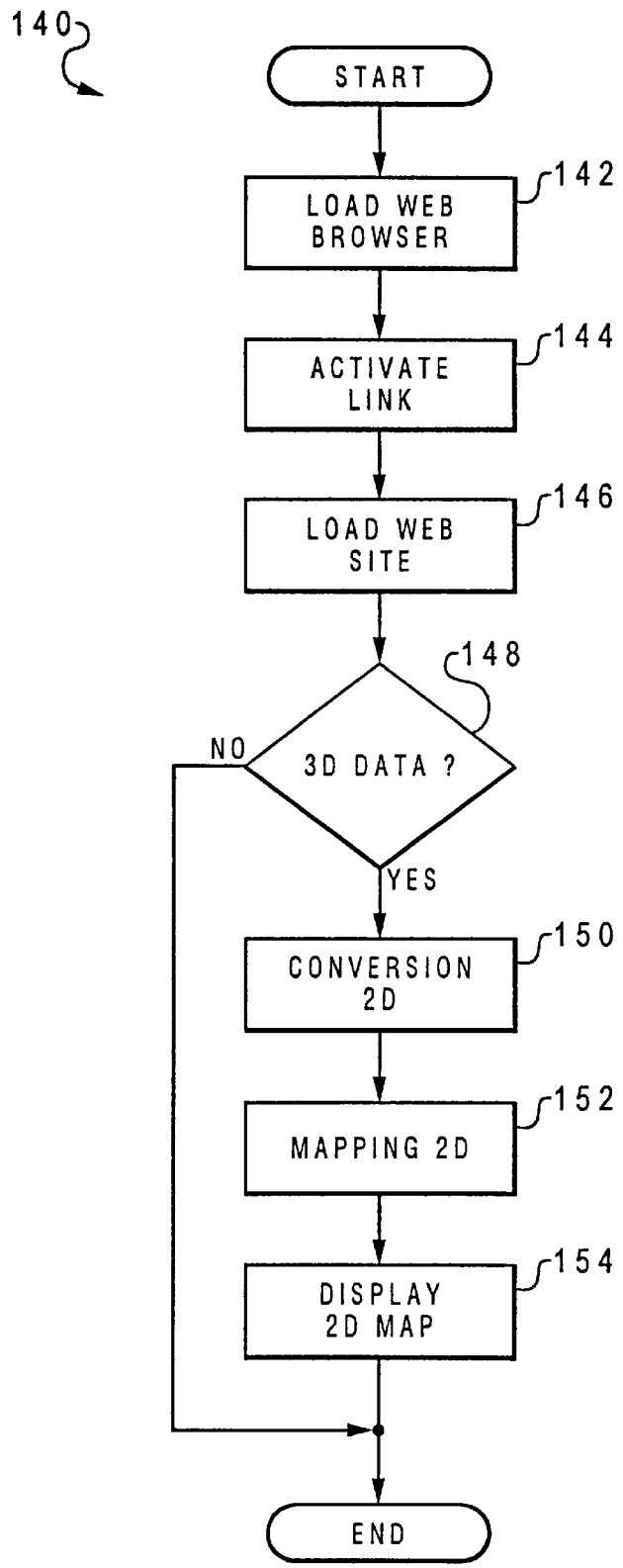
FIG. 7 depicts a flowchart of operations illustrating a method for providing a two-dimensional network navigation aid based on a three-dimensional Web site which can be implemented in accordance with a preferred embodiment of the present invention.

FIG. 7 depicts a flowchart of operations 140 illustrating a method for providing a two-dimensional network navigation aid based on a three-dimensional Web site, and which can be implemented in accordance with a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient, at times, by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems, such as general-purpose digital computers or other similar devices. In all cases, the distinction between the method operations in operating a computer and the method of computation itself should be borne in mind. The present invention relates to method steps for operating a computer, such as computer 10 of FIG. 1 and FIG. 2, in processing electrical or other (e.g. mechanical, chemical) physical signals to generate other desired physical signals.

Thus, as illustrated at block 142, the method begins when a Web browser is loaded into a computer system such as computer 10 of FIG. 1 and FIG. 2. The computer system is included within a network following a client-server relationship as described herein. The computer system in which the Web browser is displayed functions as a client. It can be assumed for purposes of illustration that the Web browser contains hypertext links of the type described in the text relating to FIG. 6 herein.

As depicted at block 144, a hypertext link is activated by "clicking," with a pointing device, the hypertext link. The Web browser running on the client utilizes a TCP/IP connection to pass a request to a Web server running an HTTP "service" (under the WINDOWS operating system) or "daemon" (under the UNIX operating system). The HTTP service then responds to the request, typically by sending the Web page formatted in HTML, to the browser. Thus, if the link is successfully activated, the client issues a TCP/IP request to the network (i.e., assuming the link was to a Universal Resource Locator). A handshaking period follows during which the client waits for an appropriate response from the server. When the server sends an appropriate response, the Web site associated with the activated link is then loaded into the Web browser and displayed as a Web page within a window of a graphical user interface, as described at block 146.

As depicted at block 148, a test is performed to determine whether the Web page contains data displayed in a three-dimensional fashion. For example, a Web page may be displayed as a three-dimensional configuration of doors, windows, and hallways. In response to moving a cursor, via a pointing device, to various areas about the displayed three-dimensional Web page, the user, in essence, can navigate through various three-dimensional representations of doors, windows, and hallways displayed by the graphical user interface in which the Web browser is running. By opening the representation of a door, for example, the user might enter the representation of a hallway.

By utilizing a pointing device, such as a mouse, to move a graphical cursor to various displayed objects contained with the representation of the hallway, certain actions can be initiated via the Web browser. One object might actually be a hypertext link that can activate launching of another Web site. Another object, when "clicked" via a pointing device, might activate the display of an informational data base. As the user navigates through the various representations of hallways, windows, and doors, the user may become "lost" and unable to find a path back to the originating Web page. In so doing, important data might be lost when the user, in frustration, simply "gives up" and terminates the network navigation session by closing the Web browser currently running with the computer system. The operation described at block 148 determines whether or not the Web page is a Web page containing three-dimensional data.

If it is determined that the Web page does not contain three-dimensional data, then the method steps terminate, and the Web page is loaded normally into the Web browser for display. If, however, it is determined that the Web page, in fact, does contain three-dimensional data, then as depicted at block 150 the three-dimensional data is converted or translated into a two-dimensional viewable map. This can be accomplished, as illustrated at block 152, by mapping subroutines or substructures referred to or contained by the displayed Web page. Each subroutine or substructure is reflected on a two-dimensional map, as indicated at block 154. The two-dimensional map allows the user to have a clear view of the paths that may be taken from the originally displayed Web page. Thus, the present location within the three-dimensional environment is always clearly presented to the user relative to the point of entry. As the user moves the graphical cursor via a pointing device, such as a mouse, over various portions of the two-dimensional map, those areas indicative of accessibility to another portion of the three-dimensional world represented by the three-dimensional Web site are highlighted to indicate such accessibility.

Figure 8:
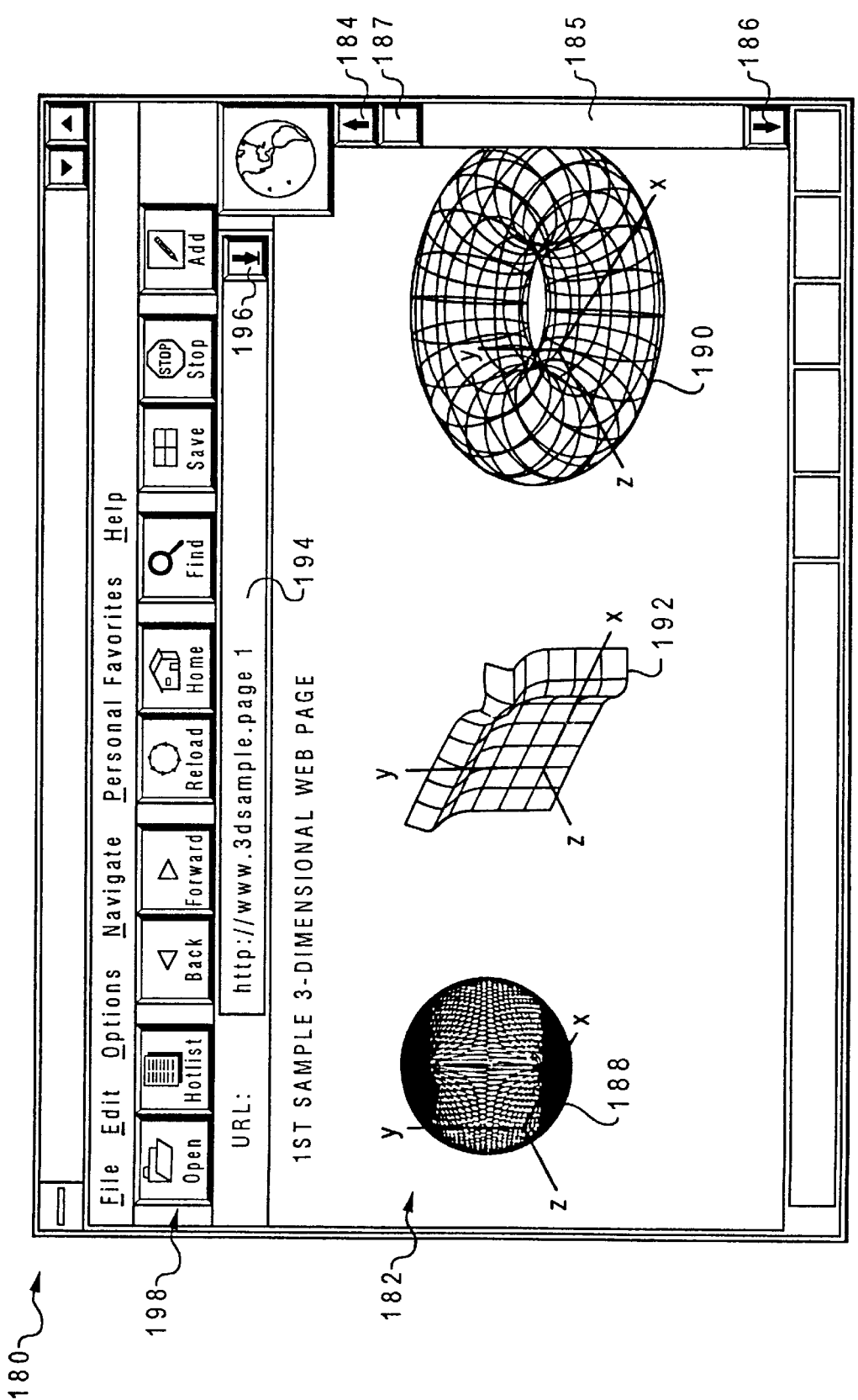
FIG. 8 illustrates a sample three-dimensional Web page displayed within a window of a graphical user interface which can be implemented in accordance with a preferred embodiment of the present invention.
Figure 9:
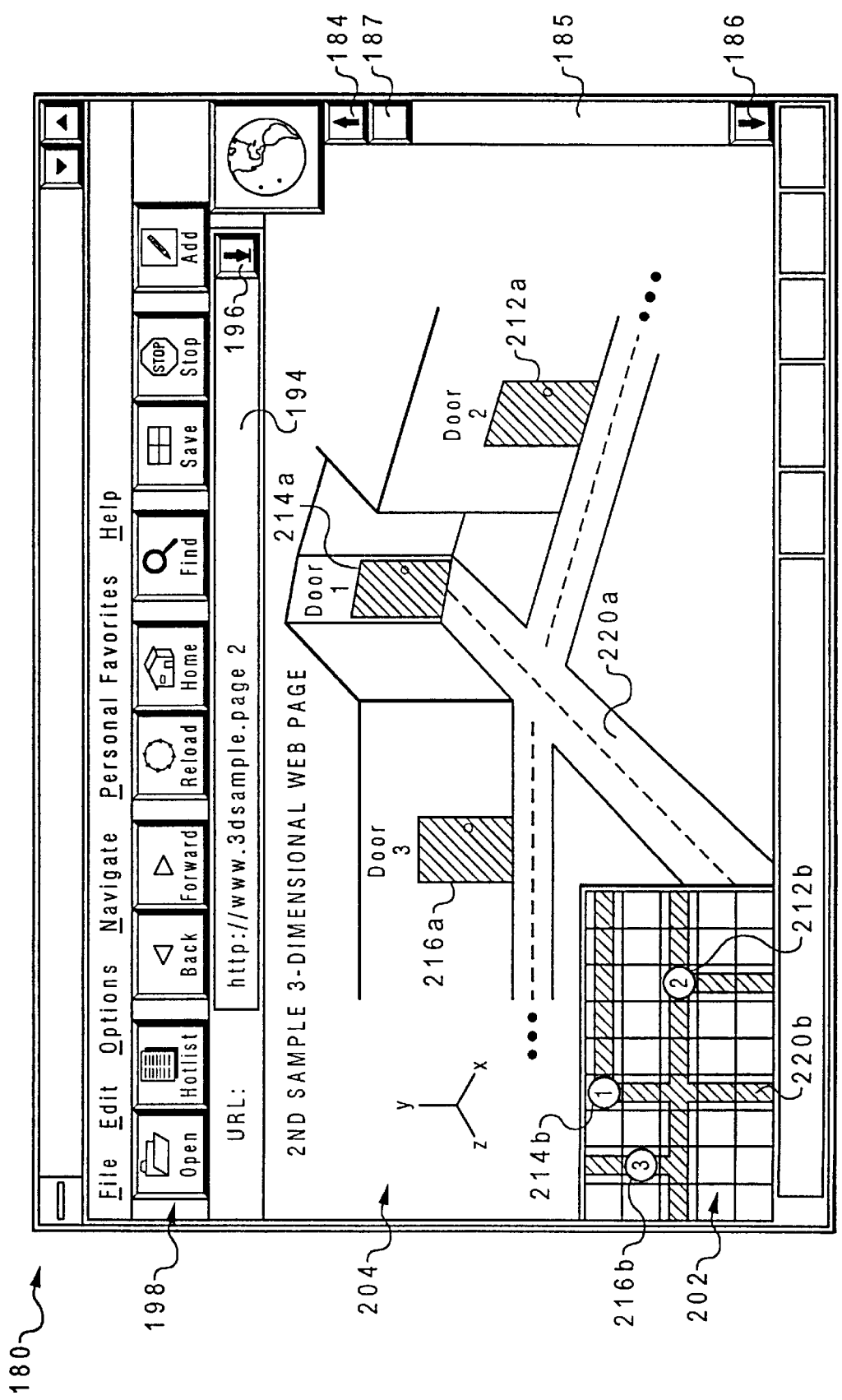
FIG. 9 depicts a sample-three dimensional Web page and an associated two-dimensional map displayed within a window of a graphical user interface in accordance with a preferred embodiment of the present invention.
Figure 10:
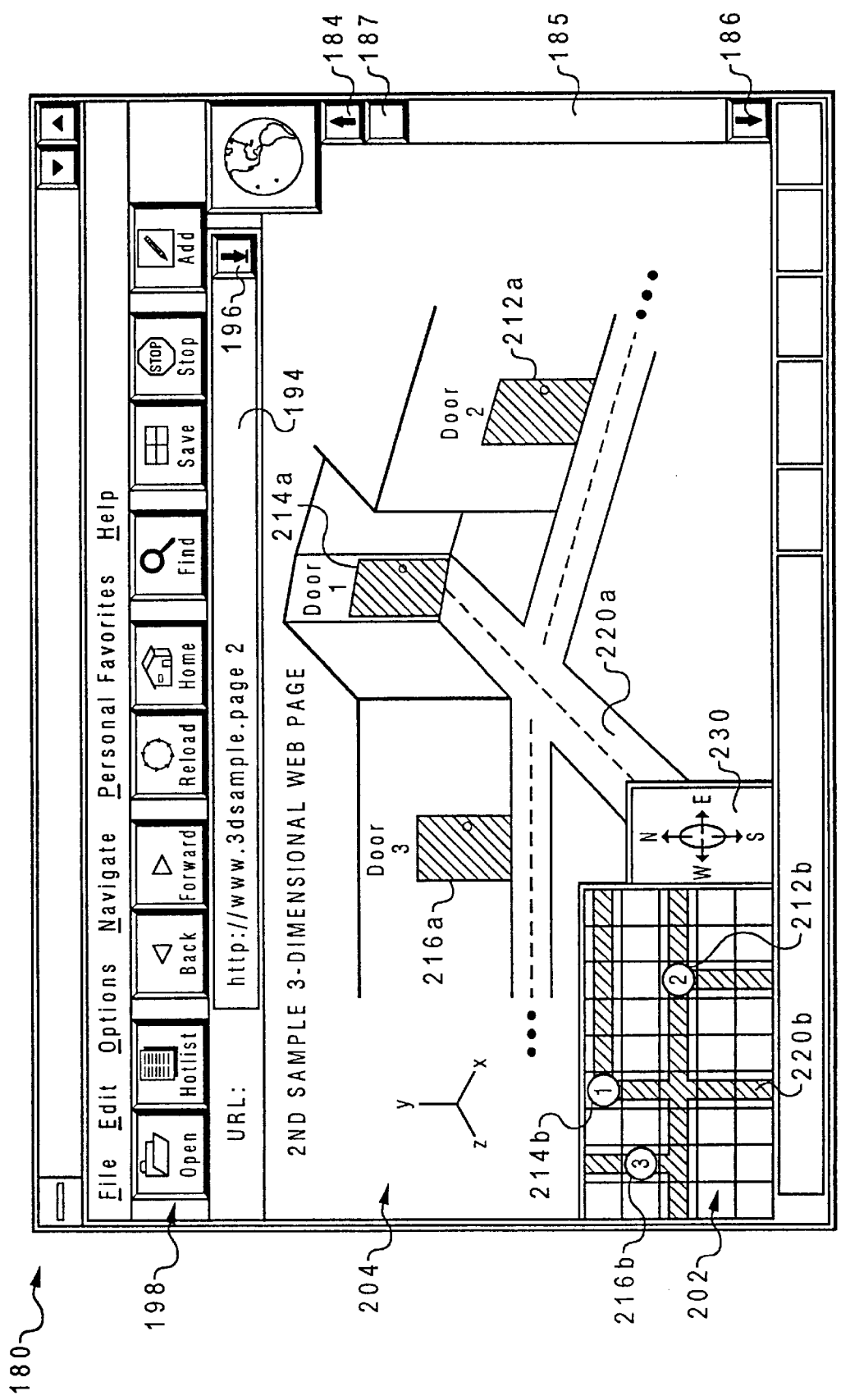
FIG. 10 depicts a sample three-dimensional Web page, an associated two-dimensional map and a compass icon displayed within a window of a graphical user interface in accordance with a preferred embodiment of the present invention.

FIG. 8 illustrates a sample three-dimensional Web page 182 displayed within a window 180 of a graphical user interface, and which can be implemented in accordance with a preferred embodiment of the present invention. In FIG. 8, FIG. 9, and FIG. 10, like parts are indicated by like numbers. Window 180 shown in FIG. 9 is analogous to window 104 depicted in FIG. 6. In order to demonstrate how a three-dimensional Web page might appear to a user, several FIGS. 188, 190, and 192, including associated three-dimensional coordinates X,Y,Z are depicted within Web page 182.

Web page 182 also includes a space in which the Universal Resource Locator associated with the current Web page is displayed. Arrow 196 allows a user to view a list of other Universal Resource Locators encountered by the Web browser during the current navigation session. Activation of arrow section 196 prompts a display (not shown) of this list. Arrow section 184, scroll bar 185, slider 187, and arrow section 186 are analogous to the graphical user interface arrow sections, scroll bar, and slider depicted in FIG. 6. A row of icons 198 provides various Web browser functions, including, but not limited to, opening files and storing Universal Resource Locators for later retrieval.

FIG. 9 depicts a sample three-dimensional Web page 204 and an associated two-dimensional map 202 displayed within window 180 in accordance with a preferred embodiment of the present invention. Displayed within Web page 204 are graphical representations of doors, as indicated at 212a, 214a, and 216a. Also included within Web page 204 is a graphical representation of a path or road 220a. In accordance with the method described herein, because Web page 204 contains three-dimensional data, an associated two-dimensional map 202 is displayed at the corner of window 180. Markers 212b, 214b, and 216b correspond respectively to doors 212a, 214a, and 216a. Likewise, path 220b corresponds to path 220a.

Two-dimensional map 202 allows a user to move freely about the Web site by activating any of these markers. For example, if a user utilizes a pointing device such as a mouse to place a graphical cursor pointer over marker 214b, and subsequently "clicks" or activates the pointing device, the Web page displayed within window 180 vanishes, and a new Web site or Web page associated with marker 214b, is thereafter displayed within window 180. When this event occurs, a new Universal Resource Locator 194 associated with the newly loaded Web page or Web site will be displayed. This functionality allows a user to move directly from a current position within the three-dimensional representative environment to a desired location without bothering to navigate through three-dimensional data (e.g., other doors, hallways, etc.) that lie in-between. It can be appreciated by one skilled in the art that, as the user moves through the three-dimensional environment, the two-dimensional map will be updated and altered in accordance with the user's movements through the three-dimensional environment. New markers will be added corresponding to the graphical representations that appear within a newly displayed Web page.

FIG. 10 depicts sample three-dimensional Web page 204, an associated two-dimensional map 202, and a compass icon 230 displayed within window 180 in accordance with a preferred embodiment of the present invention. Compass icon 230 is a graphical object that provides an additional functionality of allowing the user to maintain a sense of direction while utilizing two-dimensional map 202. Compass icon 230 shifts according to a user's movements across the two-dimensional map.

While the invention has been particularly shown as described with reference to a preferred embodiment, it will be understood by those skilled in the art that various changes in form and detail may be made therein without departing from the spirit and scope of the invention. For example, the present invention is applicable to other communication networks besides the Internet, including so-called "intranets" (i.e., networks that are internal to particular organizations). The Internet, as described herein, is merely one example of a remote network that can be utilized in accordance with a preferred embodiment of the present invention. Utilization of the Internet in conjunction with the method and system described herein is not a necessary feature of the present invention. It is therefore contemplated that such modifications can be made without departing from the spirit or scope of the present invention as defined in the appended claims.

What is claimed is:

1. A method in a computer network for providing a two-dimensional representation of a three-dimensional graphic representation to be displayed in association with said three-dimensional graphic representation, wherein said computer network includes at least one client connectable to at least one server, comprising the steps of:

transferring a remote application from said at least one server to a client;

displaying said remote application within a graphic interface of said client;

automatically searching said remote application for three-dimensional data representative of a three-dimensional graphic representation;

if said remote application includes three-dimensional data, automatically converting said three-dimensional data to a two-dimensional representation; and thereafter displaying said two-dimensional representation within said graphic interface such that said two-dimensional representation is displayed in association with said three-dimensional graphic representation of said remote application.

2. The method of claim 1 wherein the step of thereafter displaying said two-dimensional representation within said graphic interface such that said two-dimensional representation is displayed in association with said remote application, further comprises the step of:

thereafter displaying said two-dimensional representation within said graphic interface as a two-dimensional map such that said two-dimensional representation is displayed in association with said remote application.

3. The method of claim 2 further comprising the step of displaying a directional pointer within said graphic interface in association with said two-dimensional map.

4. The method of claim 3 wherein the step of displaying a representation of a directional pointer within said graphic interface in association with said two-dimensional map, further comprises the step of:

displaying an icon representative of a directional compass within said graphic interface in association with said two-dimensional map.

5. A system in a computer network for providing a two-dimensional representation of a three-dimensional graphic representation to be displayed in association with said three-dimensional graphic representation, wherein said computer network includes at least one client connectable to at least one server, comprising:

transfer means for transferring a remote application from said at least one server to a client;

first display means for displaying said remote application within a graphic interface of said client;

search means for automatically searching said remote application for three-dimensional data representative of a three-dimensional graphic representation;

converting means, if said remote application includes three-dimensional data, for automatically converting said three-dimensional data to a two-dimensional representation; and second display means for thereafter displaying said two-dimensional representation within said graphic interface such that said two-dimensional representation is displayed in association with said three-dimensional graphic representation of said remote application.

6. The system of claim 5 wherein said two-dimensional representation comprises a map of said three-dimensional graphic representation.

7. The system of claim 6 further comprising third display means for displaying a directional pointer within said graphic interface in association with said two-dimensional map.

8. The system of claim 7 wherein said directional pointer further comprises an icon representative of a directional compass.

9. A program product residing in computer memory in a computer system for providing a two-dimensional representation of a three-dimensional graphic representation to be displayed in association with said three-dimensional graphic representation, wherein said computer network includes at least one client connectable to at least one server, said program product comprising:

transfer means for transferring a remote application from said at least one server to a client;

first display means for displaying said remote application within a graphic interface of said client;

search means for automatically searching said remote application for three-dimensional data representative of a three-dimensional graphic representation;

converting means, if said remote application includes three-dimensional data, for automatically converting said three-dimensional data to a two-dimensional representation;

second display means for thereafter displaying said two-dimensional representation within said graphic interface such that said two-dimensional representation is displayed in association with said three-dimensional graphic representation of said remote application; and signal-bearing media bearing said transfer means, said first display means, said search means, said converting means, and said second display means.

10. The program product of claim 9 wherein said two-dimensional representation comprises a map of said three-dimensional graphic representation.

11. The program product of claim 10 further comprising third display means for displaying a directional pointer within said graphic interface in association with said two-dimensional map.

12. The program product of claim 11 wherein said directional pointer further comprises an icon representative of a directional compass.

13. The program product of claim 12 wherein said signal-bearing media further comprises:

signal-bearing media bearing said third display means.

14. The program product of claim 13 wherein:

said signal-bearing media further comprises transmission media.

15. The program product of claim 13 wherein:

said signal-bearing media further comprises recordable media.

* * * * *